United States Patent [19]

Valente

[11] Patent Number: 5,590,572
[45] Date of Patent: Jan. 7, 1997

[54] LOCKING DIFFERENTIAL INCLUDING ACCESS WINDOWS FOR C-CLIP RETAINERS

[75] Inventor: Paul J. Valente, Berkley, Mich.

[73] Assignee: Titan Wheel International, Inc., Quincy, Ill.

[21] Appl. No.: 508,452

[22] Filed: Jul. 28, 1995

[51] Int. Cl.⁶ ................................. F16H 48/12
[52] U.S. Cl. ......................... 74/650; 74/665 F
[58] Field of Search ............... 74/650, 665 F, 74/665 G, 665 GA

[56]           References Cited
         U.S. PATENT DOCUMENTS

| 1,934,721 | 11/1933 | Lawler | 74/650 |
| 4,103,564 | 8/1978 | Caldwell | 74/650 |
| 4,507,984 | 4/1985 | Goscenski, Jr. | 74/650 |
| 4,513,633 | 4/1985 | Goscenski, Jr. | 74/650 |
| 4,524,640 | 6/1985 | Neumann et al. | 74/650 |
| 4,557,158 | 12/1985 | Dissett et al. | 74/650 |
| 4,644,818 | 2/1987 | Choma et al. | 74/650 |
| 4,727,769 | 3/1988 | Wu | 74/650 X |
| 4,745,818 | 5/1988 | Edwards et al. | 74/650 |
| 4,960,011 | 10/1990 | Asano | 74/650 |
| 5,189,930 | 3/1993 | Kameda | 74/665 F X |

*Primary Examiner*—Charles A. Marmor
*Assistant Examiner*—Peter Kwon
*Attorney, Agent, or Firm*—Laubscher & Laubscher

[57]                ABSTRACT

A locking differential includes a housing containing a chamber and a pair of opposed openings for receiving a pair of axially spaced output shafts, respectively, a pair of side gears adapted for non-rotatable connection with the respective output shafts, concentrically arranged annular center driver gear and center cam members arranged coaxially about the adjacent ends of the output shafts, and annular clutch members operable by the center cam member to disconnect an overrunning output shaft, characterized in that the center driver gear and center cam members contain radially extending access openings to permit manual mounting of C-clip retainers in peripheral grooves contained in the adjacent ends of the output shafts.

12 Claims, 5 Drawing Sheets

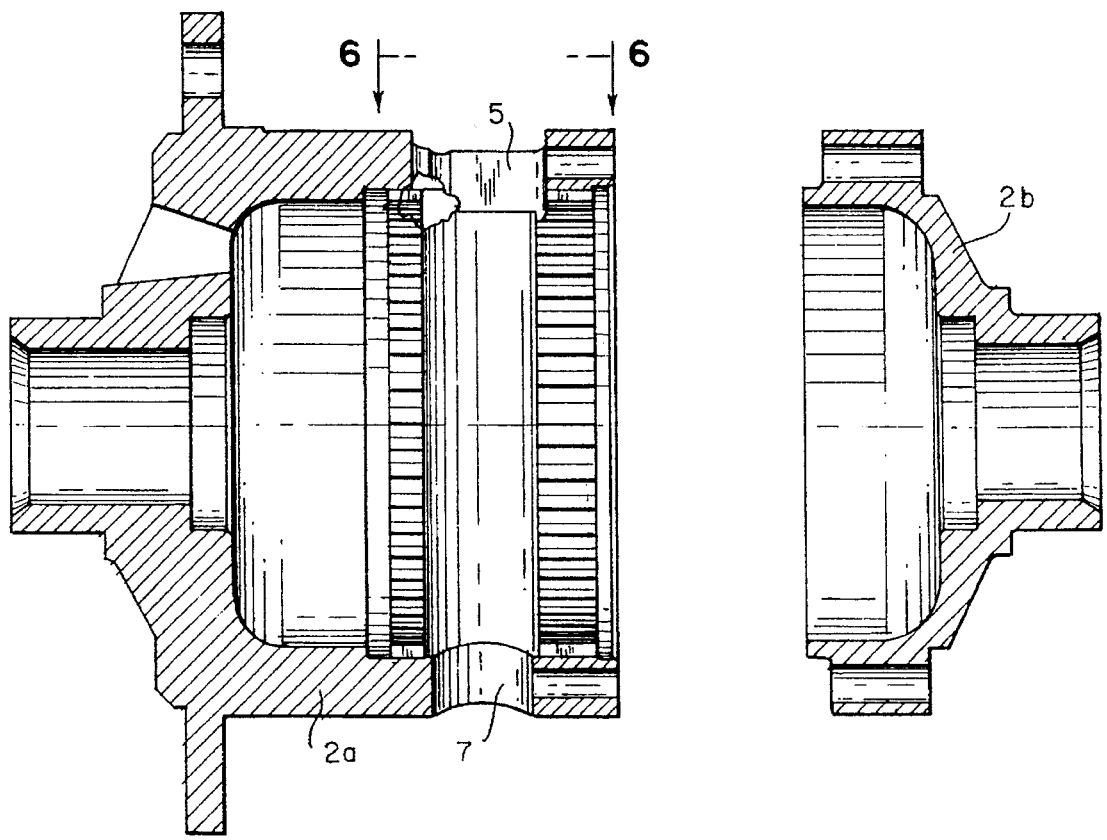
FIG. 4
FIG. 5
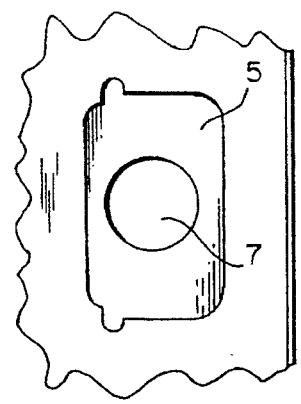
FIG. 6
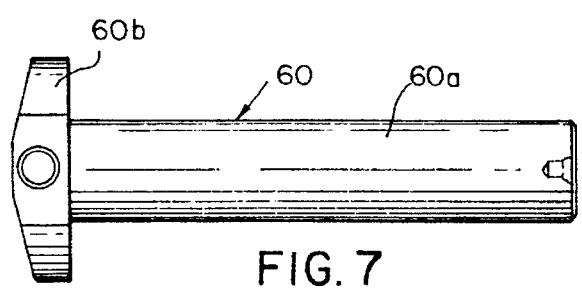
FIG. 7
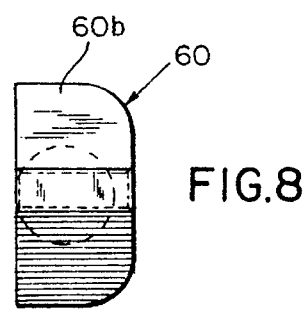
FIG. 8

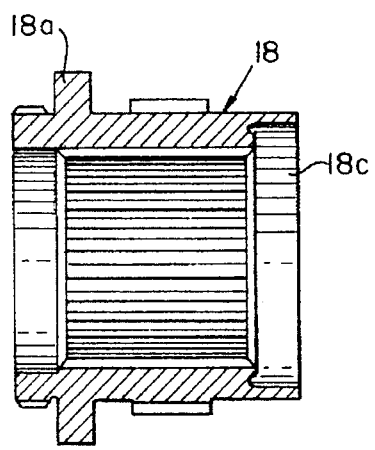
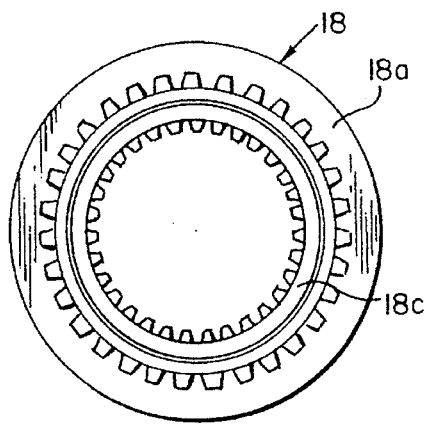
FIG. 9     FIG. 10
FIG. 11     FIG. 12
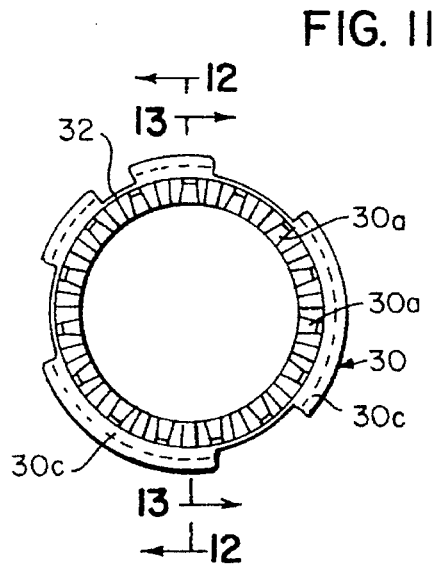
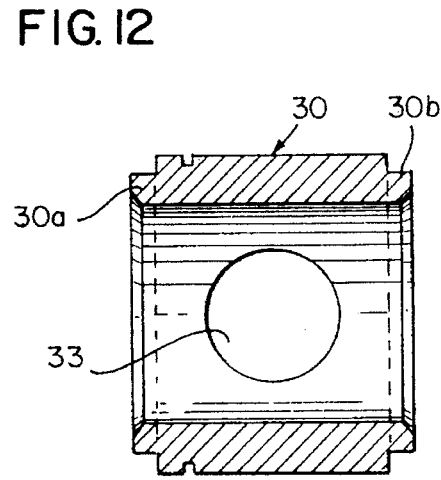
FIG.13
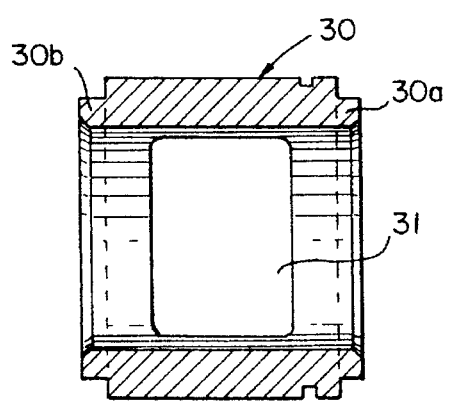

5,590,572

1
LOCKING DIFFERENTIAL INCLUDING ACCESS WINDOWS FOR C-CLIP RETAINERS

STATEMENT OF THE INVENTION

A locking differential includes a housing, a center driver gear member and a center cam member each containing access openings that are aligned to permit manual mounting of a pair of C-clip retainers in peripheral grooves contained in the adjacent ends of the output shafts, respectively.

BRIEF DESCRIPTION OF THE PRIOR ART

Locking differentials for automatically disengaging an overrunning output shaft from the drive mechanism are well known in the prior art, as shown by the patents to Dissett et al U.S. Pat. No. 4,557,158, Choma et al U.S. Pat. No. 4,644,818 and Edwards et al U.S. Pat. No. 4,745,818, each assigned to the same assignee as the present invention. In these differentials, center cam means serve to disengage an overrunning output shaft, and holdout rings maintain the output shaft in the disengaged state as long as the overrunning condition continues.

In such differentials, spacer means are often provided between the adjacent ends of the output shafts, thereby to resist the axial forces which tend to displace the output shafts toward each other. One problem occurring in such differentials is that of resisting the axial forces which tend to separate the output shafts during differential operation.

The present invention was developed to avoid the above and other drawbacks of the known types of locking differentials.

SUMMARY OF THE INVENTION

A primary object of the present invention is to provide an improved locking differential in which the housing and the concentrically arranged center cam and center driver members contain aligned radially-extending access windows which permit manual insertion of C-clip retainers within corresponding peripheral grooves contained in the adjacent ends of the output shafts, respectively, thereby to retain the output shafts against axial separation relative to the differential housing.

According to a more specific object, the adjacent ends of the side gears of the differential contain counterbores which serve not only as abutment-defining surfaces for preventing axial separation of the C-clips and the output shafts connected thereto relative to the differential housing, but also as means for retaining the C-clips in their respective grooves contained in the output shafts.

A further object of the invention is to provide a diametrically arranged spacer pin that extends between the adjacent ends of the output shafts, and means for removably bolting the spacer pin to the differential housing. Consequently, with the spacer pin removed, after the C-clips are mounted in the output shaft grooves and the output shafts are slightly axially separated to cause the C-clips to be received within the counter bores in engagement with the bottom walls thereof, the spacer pin can be inserted between the adjacent shaft ends and be bolted to the housing, thereby to complete the drive train.

BRIEF DESCRIPTION OF THE DRAWINGS

Other objects and advantages of the invention will become apparent from a study of the following specification, when viewed in the light of the accompanying drawing, in which:

FIGS. 4 and 5 are sectional views of the main body and end cover sections of the differential housing;

FIG. 6 is a detailed view of the housing taken along line 6—6 of FIG. 4;

FIGS. 7 and 8 are longitudinal side and left-hand end views of the spacer pin of the differential of FIG. 1;

FIGS. 9 and 10 are longitudinal sectional and right hand end views of one of the side gears of FIG. 1;

FIG. 11 is an end view of the center cam member of FIG. 1, and FIGS. 12 and 13 are sectional views taken along lines 12—12 and 13—13 of FIG. 11;

DETAILED DESCRIPTION

Figure 1:
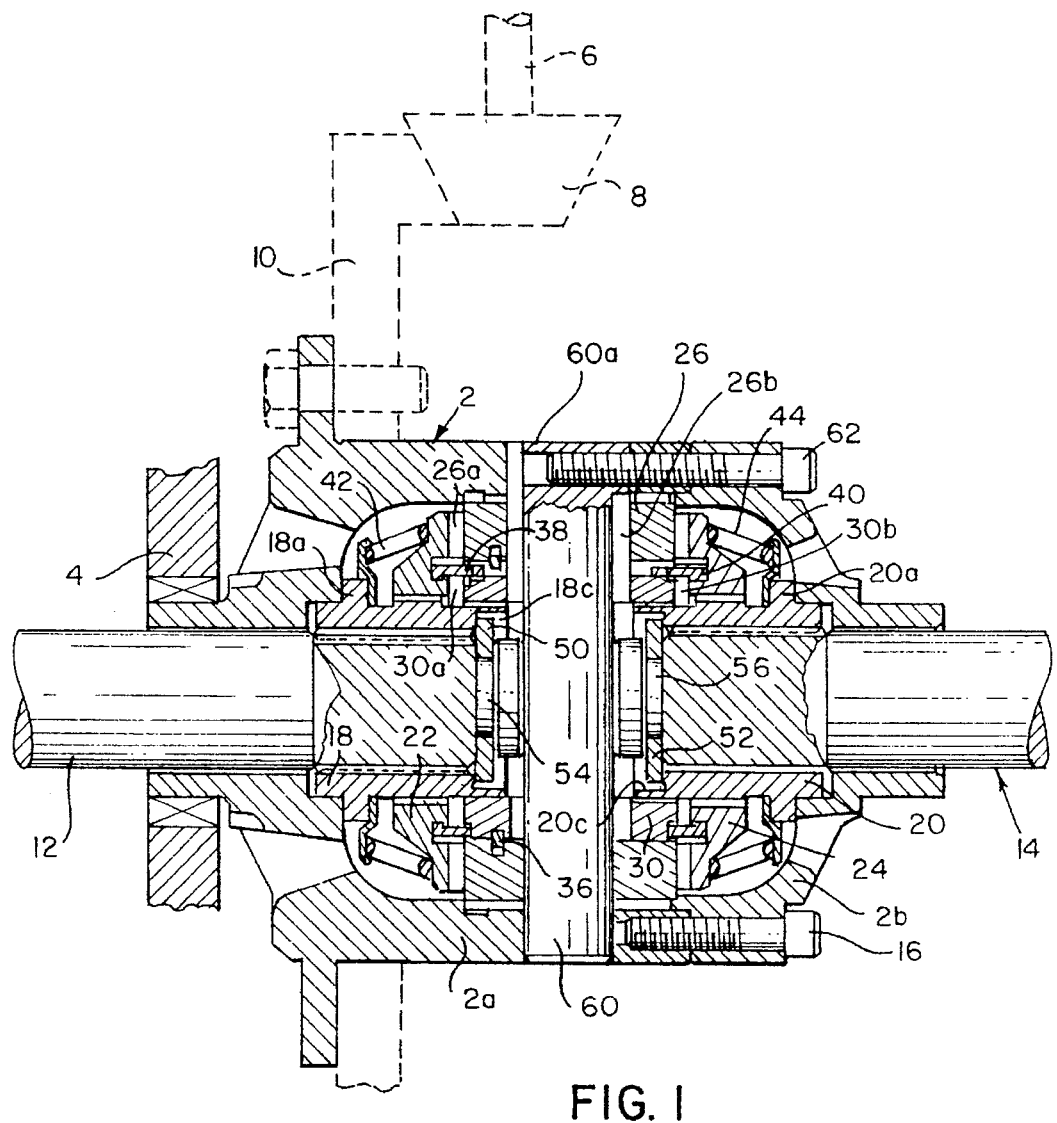
FIG. 1 is a longitudinal sectional view of the locking differential of the present invention.
Figure 2:
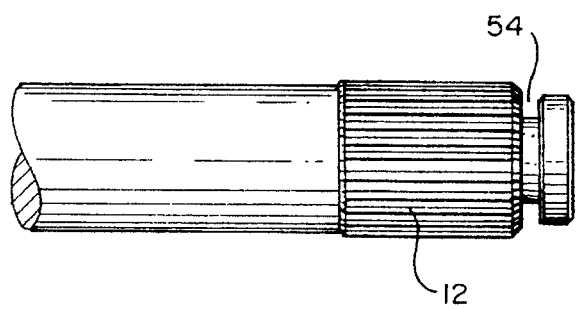
FIG. 2 is a detailed elevational view of the grooved end of one of the output shafts.
Figure 3:
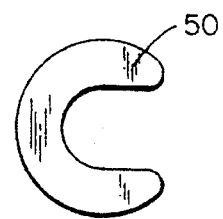
FIG. 3 is an elevational view of one of the C-clip retainers of FIG.

Referring first more particularly to FIG. 1., the differential of the present invention includes a housing 2 that is rotatably supported within the differential casing 4 for rotatably driven movement by input shaft 6 via pinion 8 and ring gear 10, thereby to drive the aligned output shafts or axles 12 and 14 that are respectively connected with the driven wheels (not shown) of the vehicle.

Figure 16:
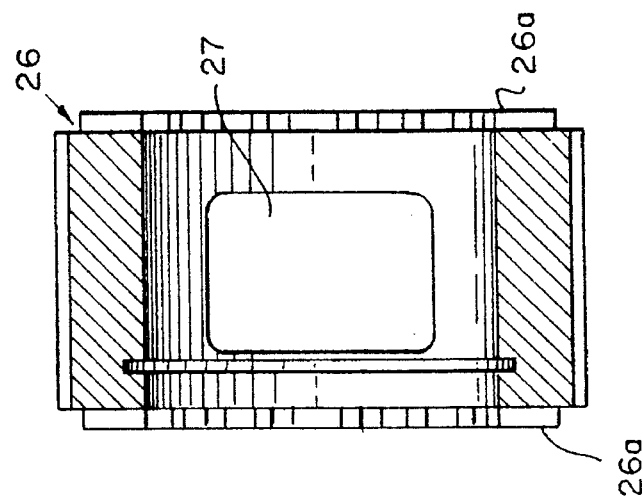
Figure 14:
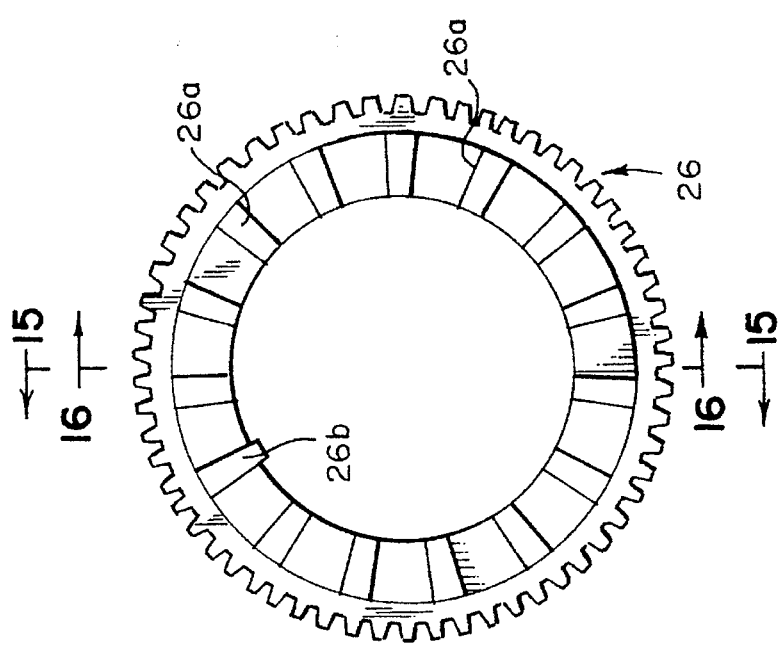
FIG. 14 is an end view of the center driven gear member of FIG. 1, and FIGS. 15 and 16 are sectional views taken along lines 15—15 and 16—16 of FIG. 14.
Figure 15:
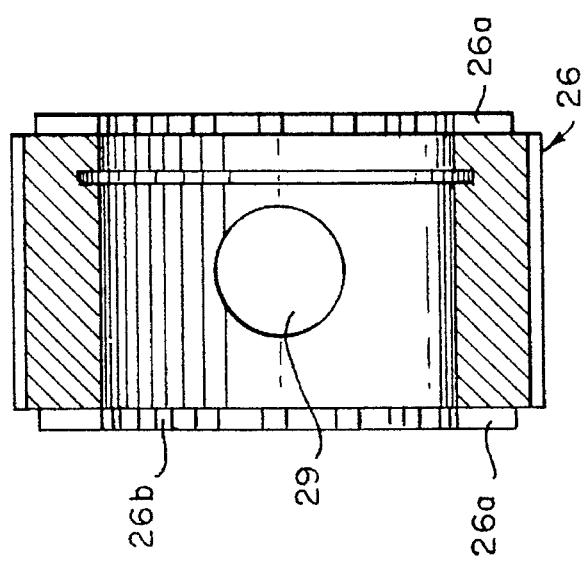
Figure 17:
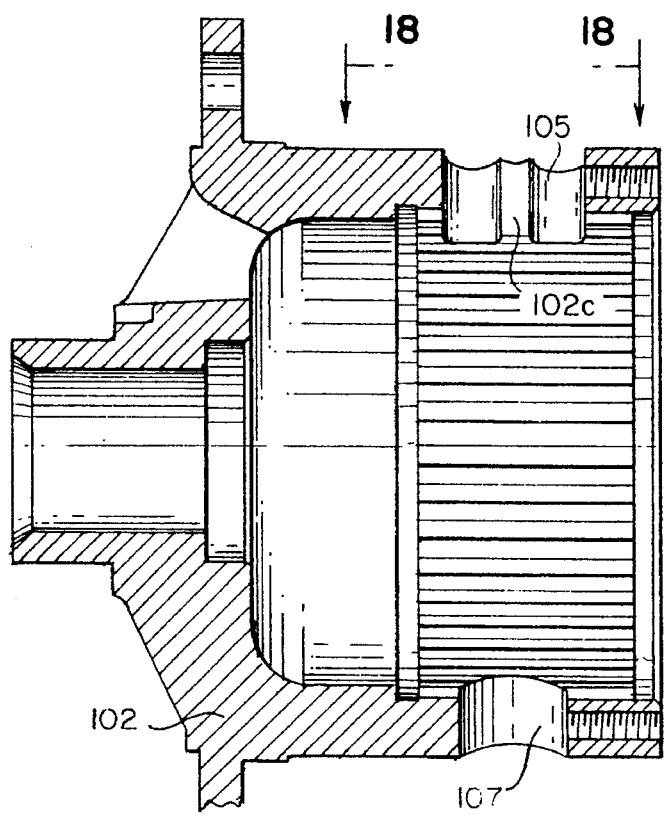
FIG. 17 is a longitudinal sectional view of a modification of the housing body section of FIG. 4.
Figure 18:
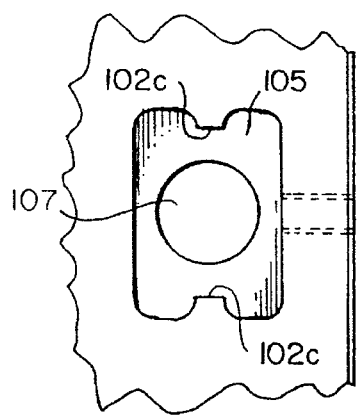
FIG. 18 is a detailed view taken along line 18—18 of FIG. 17.
Figure 19:
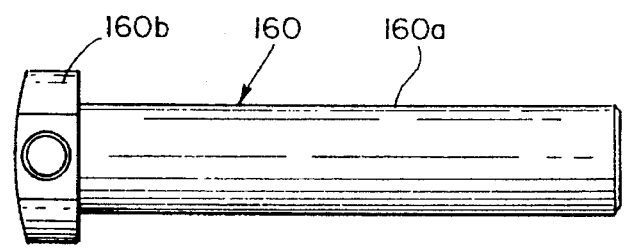
FIGS. 19 and 20 are longitudinal elevation and end views, respectively, of a spacer pin designed for use with the housing section of FIG. 17.
Figure 20:
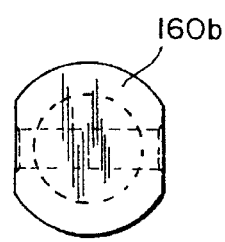

The housing 2 is sectional and includes a main body section 2a and a removable end section 2b that are bolted together by bolts 16. As is known in the art, a pair of side gears 18 and 20 are non-rotatably splined to the output shafts 12 and 14, respectively, and a pair of clutch gear members 22 and 24 are mounted for axial sliding movement on the side gears 18 and 20, respectively. Annular center driver gear member 26 is non-rotatably splined to the housing 2 between the clutch members 22 and 24, which center driver gear member is provided at each end with drive gear teeth 26a as best shown in FIGS. 14-16.

Arranged concentrically within the center driver gear member 26 and between the side gears 22 and 24 is a center cam member 30 which is provided at each end with a plurality of cam teeth 30a and 30b, as best shown in FIGS. 11-13. As is known in the art, the center cam member 30 is keyed for limited angular movement relative to the center driver member by the cooperation between internal key 26b (FIG. 14) on the inner circumference of the central driver gear member 26, and the corresponding oversize slot 32 contained in the outer circumference of the center cam member 30. Snap ring 36 extends within corresponding grooves contained in the outer and inner circumferential surfaces of the center cam member and the center driver gear member, thereby to prevent relative axial movement between the two members. Conventional holdout rings 38 and 40 are connected with the side gears 22 and 24, respectively, thereby to maintain in a disengaged condition that clutch member 22 or 24 that is associated with an overrunning output shaft 12 or 14, respectively, as will be described in greater detail below.

The side gear 18 (FIGS. 9 and 10) is provided with an annular outer rib portion 18a that abuts a corresponding annular support surface on the inner wall of the housing chamber, as shown in FIG. 1. The shoulder 18a similarly supports spring means 42 that normally bias clutch member 22 toward engagement with the central drive gear means 26. Similarly, the side gear 20 includes an annular external rib portion 20a that is adapted to abut the corresponding inner wall surface of the housing section 2b, and also to support the spring 44 that biases the clutch member 24 toward engagement with the center drive gear member 26.

The output shafts or axles 12 and 14 are retained against axial displacement apart by a pair of C-clips 50 and 52 that extend within corresponding peripheral grooves 54 and 56 contained adjacent the end of the output shafts 12 and 14, respectively. The C-clips are contained in counterbores 18c and 20c contained in the adjacent ends of the side gears 18 and 20, respectively. As will be explained below, the C-clips abut the bottom walls of the counterbores 18c and 20c to prevent relative axial separation of the C-clips and the output shafts 12 and 14 connected thereto.

In order to prevent the output shafts 12 and 14 from being axially displaced together, a spacer pin 60 is provided that extends diametrically across the housing chamber. The spacer pin includes a cylindrical body portion 60a that is abutted by the adjacent ends of the output shafts 12 and 14, and an enlarged head portion 60b that is received within a corresponding access opening 5 (FIG. 4) contained in the body section 2a. Bolt 62 serves to releasably maintain the spacer pin in connected relation relative to the housing 2. At its other end, the cylindrical body portion 60a extends within a corresponding through bore 7 contained in the housing body section 2a.

In accordance with a characterizing feature of the invention, in addition to the housing access opening 5, in order to provide access to the C-clips 50 and 52 when the spacer 60 is removed from the differential, a pair of aligned radially-arranged access window 27 (FIG. 16) and 31 (FIG. 13) are provided in the center driver gear member 26 and the center cam member 30, respectively. Diametrically arranged in these members opposite the access windows are through bores 29 (FIG. 15) and 33 (FIG. 12) that receive the body portion 60a of the spacer pin 60. The center driver gear member is so connected with the housing that access window 27 is opposite housing access window 27, and the access windows 27 and 31 are maintained generally opposite each other by the cooperation between internal locator projection 26b on the center driver member 26 (FIG. 14), and slot 32 on the outer periphery of the center cam member (FIG. 11).

To connect the output shafts 12 and 14 to an assembled differential mechanism, the bolt 62 is removed to permit removal of the spacer pin 60 from the housing, whereupon the output shaft 12 is axially introduced into the differential within side gear 18 until the groove 54 is exposed in the aligned access windows 31 and 27 contained in the center cam and center drive gear members. C-clip 50 is introduced into the housing chamber via openings 5, 27 and 31 and is inserted within the groove 54. The axle 12 is then axially displaced to the left to cause the C-clip 50 to be contained within the counterbore 18c thereby to retain the C-clip within the groove 54, and to prevent axial displacement to the left of the axle 12. Similarly, the axle 14 may then be inserted axially into the differential mechanism until the groove 56 is exposed in the windows 5, 27 and 31, whereupon the second C-clip 50 is inserted within the groove 56 provided in the outer periphery of the output axle 14. The axle 14 is then shifted to the right to introduce C-clip 52 within the counterbore 20c, thereby to retain the C-clip in the groove 56. Furthermore, the C-clip abuts the bottom wall of the counterbore 20c, thereby to prevent further right hand shifting of the output shaft 14. Normally, the C-clips and axles are provided by the user of the differential.

OPERATION

The assembled differential operates in a conventional manner. Assume, for example, that the rotational velocity of the output shaft 12 overruns that of the output shaft 14 beyond a predetermined amount. In this case, the cam teeth 30a on the center cam member 30 shift clutch member 22 to the left, thereby to effect disengagement between the clutch teeth and the corresponding driving teeth 26a on the center driver member 26. The holdout ring 38 is slightly angularly displaced to a holdout position in which the axial tabs thereon engage the outer flange portions 30c of the center cam member to maintain the clutch member 22 in its disengaged condition. When the overrunning condition is terminated, the holdout ring is angularly returned to its initial position, whereupon owing to the biasing force of spring means 42, the clutch member 22 is returned into engagement with the center gear member 26. A similar differential operation occurs in the event that the right hand output shaft 14 overruns the left hand shaft 12 by a predetermined amount.

Referring now to the modification of FIGS. 17–20, in this embodiment the spacer pin 160 has a generally circular enlarged head portion 160b, which head portion is received in a generally-circular access opening defined by the diametrically arranged rib portions 102c. The remaining differential structure is identical to that of FIG. 1.

While in accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. A differential apparatus of the automatic lock-out type for rotatably driving a pair of colinearly-arranged axially-spaced output shafts from a rotatably driven input shaft, the adjacent ends of the output shafts containing peripheral grooves for receiving C-shaped retainer members, respectively, comprising:

(a) a housing containing a chamber and including a pair of opposed openings for rotatably receiving the adjacent ends of the output shafts, respectively;

(b) a pair of annular side gears colinearly arranged for rotation within said housing chamber adjacent said openings for non-rotatable connection with the output shafts, respectively;

(c) a pair of annular clutch gear members arranged concentrically about, and splined for axial displacement relative to, said side gears, respectively;

(d) annular center driver gear means colinearly arranged between said side gears, said center driver gear means being non-rotatably connected with said housing;

(e) spring means normally biasing said clutch gear members together toward engaged positions relative to said center driver gear means;

(f) annular center cam means arranged concentrically relative to said center driver gear means between said side gears for disengaging one of said side gears from said center driver gear means when the associated output shaft overruns the other output shaft by a predetermined amount;

(g) annular holdout ring means for maintaining said one side gear in the disengaged condition relative to said center driver gear means as long as the overrunning condition exists; and (h) spacer means removably connected with said housing for preventing axial displacement of the output shafts toward each other;

(i) said housing, said center driver means and said center cam means containing aligned radially-extending access windows, thereby to permit manual insertion of the C-clip retainers within the output shaft grooves, respectively.

2. Apparatus as defined in claim 1, and further including means limiting the degree of relative angular rotational displacement between said center cam means and said center driver gear means.

3. Apparatus as defined in claim 2, wherein said center cam means is arranged concentrically within said center driver gear means.

4. Apparatus as defined in claim 3, wherein said spacer means includes a spacer pin having a body portion extending diametrically across said housing chamber between the adjacent ends of the output shafts, said spacer pin including an enlarged head portion mounted in said housing axis opening, and means preventing removal of said spacer pin from said housing.

5. Apparatus as defined in claim 4, wherein said spacer pin extends through said access windows contained both in said center driver gear means and in said center cam means.

6. Apparatus as defined in claim 1, wherein said housing is sectional and includes a main body section, and a removable end cover section bolted to said main body section, each of said housing sections containing one of said output shaft openings, respectively.

7. Apparatus as defined in claim 6, wherein said side gears include abutment means arranged for cooperation with said housing and for engagement by the C-clips to prevent axial separation of the output shafts.

8. Apparatus as defined in claim 7, wherein said abutment means includes first abutment means on each of said side gear means arranged to cooperate with corresponding support surfaces on said housing means, respectively, thereby to prevent axial separation of said side gears.

9. Apparatus as defined in claim 8, wherein said first abutment means comprises an annular rib portion extending circumferentially about each side gear.

10. Apparatus as defined in claim 9, wherein said abutment means includes second abutment means defined by the bottom walls of counterbores contained in the adjacent ends of said side gears, respectively.

11. Apparatus as defined in claim 10, wherein the diameter of the side gear counterbores is slightly greater than the corresponding outer diametric dimension of the C-clips, thereby to retain the C-clips in the output shaft grooves, respectively.

12. A differential apparatus for driving a pair of output shafts from an input shaft, comprising:

(a) a housing containing a chamber and including a pair of opposed openings, said housing being adapted to be rotatably driven by the input shaft;

(b) a pair of colinearly-arranged axially-spaced output shafts the adjacent ends of which are rotatably supported in said housing openings, respectively;

(c) a pair of annular side gears arranged in said chamber and non-rotatably mounted concentrically about said output shafts, respectively;

(d) a pair of annular clutch gear members arranged concentrically about, and splined for axial displacement relative to, said side ears, respectively;

(e) annular center driver gear means colinearly arranged between said side gears, said center driver gear means being non-rotatably connected with said housing;

(f) spring means normally biasing said clutch gear members together toward engaged positions relative to said center driver gear means;

(g) annular center cam means arranged concentrically relative to said center driver gear means between said side gears for disengaging one of said side gears from said center driver gear means when the associated output shaft overruns the other output shaft by a predetermined amount;

(h) annular holdout ring means for maintaining said one side gear in the disengaged condition relative to said center driver gear means as long as the overrunning condition exists;

(i) spacer means removably connected with said housing for preventing axial displacement of the output shafts toward each other; and (j) means for preventing axial separation of said output shafts, including:
   (1) a pair of C-clips;
   (2) access window means contained in said housing, said center cam means and said center driver means for permitting manual mounting of said C-clips concentrically within corresponding peripheral locking grooves contained in the adjacent ends of the output shafts, respectively; and
   (3) abutment means on said side gears preventing axial movement of said C-clips away from each other.

* * * * *